United States Patent Office 2,904,750
Patented Sept. 15, 1959

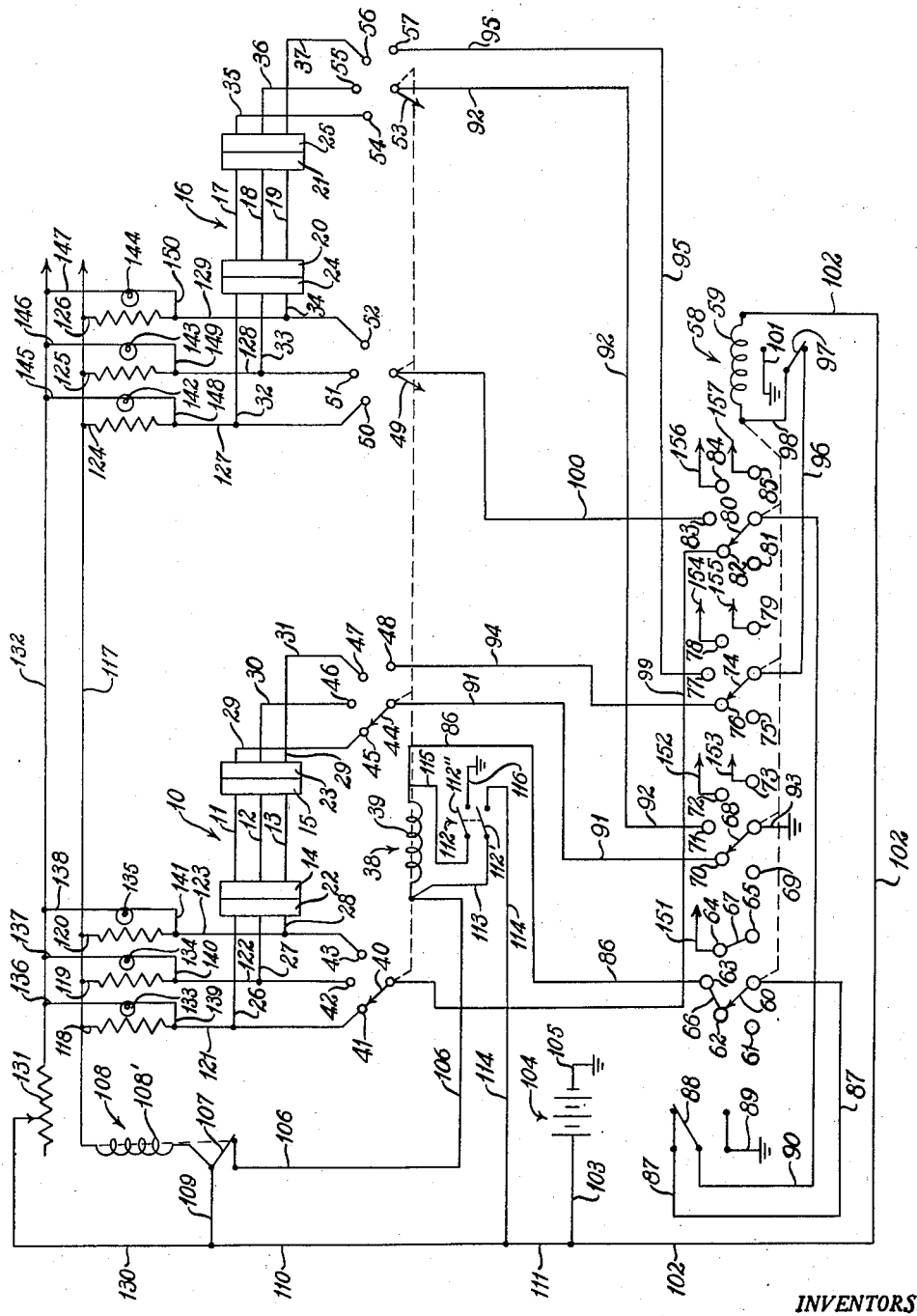

2,904,750

TESTING APPARATUS

Emil P. Gargani, North Massapequa, and Alvin A. Weiner, Babylon, N.Y., assignors to Republic Aviation Corporation, near Farmingdale, Suffolk County, N.Y., a corporation of Delaware Application February 18, 1957, Serial No. 640,670

19 Claims. (Cl. 324—51)

This invention relates in general to electrical testing apparatus and more particularly to apparatus for testing or analyzing electrical conductors.

Multiple electrical conductors are frequently grouped in or as cables and as such have come into wide use in wiring systems of many types. For example, such cables are commonly used to interconnect the electrical components of an aircraft, where the cable usually comprises a pair of plugs or, in the alternative, receptacles and a plurality of individual electrical conductors or wires, each of which is secured at its opposite ends to corresponding or matching terminals of the plugs or receptacles.

To assure the proper connection and operation of the electrical systems and of the electrical components thereof, it is essential that each wire or conductor of the system be continuous and unbroken and that its opposite ends be attached to corresponding or complemental terminals. Furthermore, it is required that each conductor be isolated or free from electrical contact with other conductors of the system to thereby prevent short circuits.

Any defects or departures from normal that may develop can render the system inoperative or subject to improper or faulty operation. It is apparent, therefore, that both the fabrication and servicing of such systems are facilitated by the use of an apparatus for testing and indicating whether or not the system is short-circuited or its conductors broken or improperly connected.

The present invention contemplates and has for one of its objects the provision of a testing or analyzing apparatus for multiple conductors especially when embodied in a cable whereby the electrical continuity and complete insulation or isolation of each conductor, including its terminal connections to plugs or receptacles, may be readily tested and indicated.

Moreover, the testing apparatus contemplated herein is so organized and arranged that it is capable of sequentially testing a plurality of units each consisting of or embodying multiple electrical conductors and also may be associated with or connected to like testing apparatus to thereby further increase and extend the capacity for testing.

With the above and other objects in view as will be apparent, this invention consists in the construction, combination and arrangement of parts all as hereinafter more fully described, claimed and illustrated in the accompanying drawing which shows a circuit diagram of the present testing apparatus.

Referring now to the drawing, 10 designates a cable consisting of the electrical conductors 11, 12 and 13 combined to establish a unit. The opposite ends of conductors 11, 12 and 13 are soldered or otherwise secured to corresponding terminals (not shown) in the conventional or standard plugs 14 and 15. It is to be understood that conventional receptacles may be used in lieu of either or both the plugs 14 and 15. Two or more cables can be sequentially tested. To illustrate this, a second cable 16 is shown and includes at least three wires, 17, 18 and 19 and plugs 20 and 21. While the cables 10 and 16 have each been illustrated as including only three conductors, it is manifest that they may contain any number of conductors and that their plugs are constructed accordingly.

The testing apparatus contemplated herein includes a pair of receptacles 22 and 23 for cooperation with and complemental to the plugs 14 and 15 of the cable 10, and also a pair of receptacles 24 and 25 for cooperation with and complemental to the plugs 20 and 21 of the cable 16.

Each receptacle 22, 23, 24 and 25 is provided with a plurality of electrical leads equal to the number of conductors in the cable to be tested and which are connected through the plugs and receptacles to the conductors of the cable. Thus, the receptacle 22 is provided with electrical leads 26, 27 and 28 that are connected through it and the plug 14 to the ends of the conductors 11, 12 and 13 respectively, while the receptacle 23 is provided with leads 29, 30 and 31 that are respectively connected through the receptacle 23 and the plug 15 to the other ends of the conductors 11, 12 and 13. In a similar manner, receptacle 24 has electrical leads 32, 33 and 34 connected through the receptacle and the plug 20 to the conductors 17, 18 and 19, respectively, and receptacle 25 has electrical leads 35, 36 and 37 connected through it and the plug 21 to the conductors 17, 18 and 19, respectively.

The electrical leads from the receptacles 22, 23, 24 and 25 are connected to a conventional, four-bank selector switch 38 having a driving coil 39 for stepping or advancing the contact arms of the switch over their respective banks of contacts. More particularly, the switch 38 has a contact arm 40 for cooperation with a first bank of contacts 41, 42 and 43 to which the leads 26, 27 and 28 are respectively connected; and a contact arm 44 which cooperates with the second bank of contacts 45, 46 and 47 to which the leads 29, 30 and 31 are respectively connected. This second bank of contacts of the selector switch 38 also embodies an additional or transfer contact 48 for the purpose to be later described. The remaining two banks of contacts in the switch 38 respectively comprise a contact arm 49 sweeping a third bank of contacts 50, 51 and 52 to which the leads 32, 33 and 34 are respectively connected and a contact arm 53 operating over a fourth bank of contacts 54, 55 and 56 to which the leads 35, 36 and 37 are respectively attached. The fourth bank of contacts also includes an additional or transfer contact 57, similar to the transfer contact 48. The contact arms 40, 44, 49 and 53 are conventionally interconnected for movement in unison over their respective banks of contacts as the coil 39 is energized. However, the contact arms 49 and 53 are out of phase with the contact arms 40 and 44 to the end that as the contact arms 40 and 44 are stepped relative to their respective banks of contacts, the contact arms 49 and 53 are progressing toward their respective initial contacts 50 and 54 but do not actually engage any of the contacts of their banks until the contact arm 44 engages the transfer contact 48.

In addition to the selector switch 38, the present apparatus also embodies a second standard selector switch 58 including four banks of contacts each having a co-operating contact arm and a driving coil 59 for stepping the contact arms in unison across their respective banks of contacts. More specifically, the selector switch 58 has a contact arm 60 for association with a first bank of contacts 61, 62, 63, 64 and 65. For purposes that will become apparent, the contacts 62 and 63 are electrically connected to each other by a wire 66 and the contacts 64 and 65 are similarly connected by a wire 67.

Additionally, the switch 58 has second, third and fourth banks of contacts consisting respectively of contacts 69, 70, 71, 72 and 73, and a cooperating contact arm 68; contacts 75, 76, 77, 78 and 79 and an associated contact arm 74; and contacts 81, 82, 83, 84 and 85 having a cooperating contact arm 80.

In the selector switch 58, the first contact of each bank of contacts, i.e., contacts 61, 69, 75 and 81 serves as a home or idle contact. Therefore, when the apparatus is not operating and the coil 59 is not energized, the contact arms 60, 68, 74 and 80 are respectively associated with these home contacts which association has no electrical function or effect. The contact 63 of the first bank of contacts of the switch 58 is connected by a lead 86 to one terminal of the selector switch 38, while the contact arm 60 is connected by a lead 87 to a manual switch 88. The switch 88 is effective in one position to connect the lead 87 to a lead 89 to ground and in a second position, as shown in the drawing, to connect the lead 87 to a lead 90 which, in turn, is connected to the contact arm 80 of the fourth bank of contacts of the switch 58. In the second bank of contacts of the switch 58, the contact 70 is connected by a lead 91 to the contact arm 44 of the second bank of contacts of the selector switch 38, the contact 71 is connected by a lead 92 to the contact arm 53 of the fourth bank of contacts of the selector switch 38, and its contact arm 68 is connected through a lead 93 to ground. In the third bank of contacts of the selector switch 58, the contact 76 is connected by a lead 94 to the transfer contact 48 of the second bank of contacts of the switch 38, the contact 77 is connected by a lead 95 to the transfer contact 57 of the fourth bank of contacts of the switch 38, while the contact arm 74 is connected through a lead 96 to a manual switch 97. The manual switch 97 is normally effective to connect the lead 96 through a lead 98 to one terminal of the selector switch 58. In the fourth bank of contacts of the selector switch 58, the contact 82 is connected by lead 99 to the contact arm 40 of the first bank of contacts of the switch 38, while the contact 83 is connected by a lead 100 to the contact arm 49 of the third bank of contacts of the switch 38, and as above set forth, the contact arm 80 is connected through lead 90, manual switch 88 and lead 87 with the contact arm 60 of the first bank of contacts of the selector switch 58. The function and purpose of the remaining two contacts in each bank of contacts of the selector switch 58, viz., contacts 64, 65, 72, 73, 78, 79, 84 and 85 will be described later herein.

As described, one terminal of the selector switch 58 is connected through the lead 98 to a manual switch 97 that in turn normally connects it to the lead 96. This manual switch 97 is also adapted to be manually moved to a second position where it connects the lead 98 to a lead 101 to ground. The other terminal of the selector switch 58 is connected through a lead 102 and a lead 103 to the positive side or terminal of a direct-current power source of substantially constant voltage, such as a battery 104. The negative side or terminal of the battery 104 is connected to ground through a lead 105. Due to this arrangement, when the manual switch 97 is brought into contact with the ground lead 101, a closed circuit results between the battery 104 and the selector switch 58 that energizes its coil 59 to move or step the contact arms 60, 68, 74 and 80 in unison across their respective banks of contacts. In particular, this circuit comprises the battery 104, the leads 103 and 102, the coil 59, the lead 98, the switch 97 and the lead 101 to ground.

The selector switch 38 is also connected to and energized by the battery 104. Thus, one terminal of the selector switch 38 and hence one side of its driving coil 39 is connected through a lead 106, a switch 107 controlled by an overcurrent relay 108 having a current sensing coil 108' and leads 109, 110 and 111 to the positive lead 103 from the battery 104. The connection to ground of the other terminal of the selector switch 38, and hence of the other side of its coil 39, varies during the operation of the instant apparatus and, therefore, which variations will be described in connection with the description of such operation.

The selector switch 38 is also connected to a manually operated, two-blade, cycling switch 112 whereby it may be connected to the battery 104 to step or move its contact arms 40, 44, 49 and 53 in unison over their respective banks of contacts. More specifically, one terminal of the selector switch 38 is connected by a lead 113, one blade 112' of the switch 112 and a lead 114 to the lead 111 which in turn is connected by the lead 103 to the positive side of the battery 104. The other terminal of the selector switch 38 is connected through a lead 115 and the second blade 112" of the switch 112 to a lead 116 which, in turn, is connected to ground. The blades 112' and 112" are conventionally interconnected for concurrent operation. Thus, when the switch 112 is moved to its closed position, i.e., with the blades 112' and 112" respectively connected to the leads 114 and 116, a cycling circuit is completed that energizes the coil 39 of the selector switch 38 to move or step its contact arms 41, 44, 49 and 53 over their respective banks of contacts. This cycling circuit comprises the battery 104, leads 103, 111, 114, blade 112', the lead 113, the coil 39, the lead 115, the blade 112" and the lead 116 to ground. Hence, by manually opening and closing the switch 112, the contact arms 40, 44, 49 and 53 of the selector switch 38 may be advanced relative to their respective banks of contacts, one contact of each bank for each closing of the switch 112.

As above described, the leads 26, 27 and 28 of the receptacle 22 and the leads 32, 33, and 34 of the receptacle 24 are respectively connected to the first and third banks of contacts of the selector switch 38. These leads also are connected through individual resistors and lamps to the power source or battery 104. More particularly, the leads 103, 111 and 110 from the positive terminal of the battery 104 are connected through the lead 109 and the coil 108' of the overcurrent relay 108 to a lead 117. This lead 117 is common to the resistors 118, 119 and 120 that are connected through their leads 121, 122 and 123 respectively to the leads 26, 27 and 28 of the receptacle 22 and to the resistors 124, 125 and 126 that are connected through their leads 127, 128 and 129 respectively to the leads 32, 33 and 34 of the receptacle 24. The leads 103, 111 and 110 from the battery 104 also are connected through a lead 130 and a variable resistor 131 to a lead 132. This lead 132 is common to the lamps 133, 134 and 135 that are respectively connected by leads 136, 137 and 138 to the common lead 132 and by leads 139, 140 and 141 respectively through the leads 121, 122 and 123 to the leads 26, 27 and 28 of the receptacle 22, and to lamps 142, 143 and 144 that are respectively connected by leads 145, 146 and 147 to the common lead 132 and by the leads 148, 149 and 150 respectively through the leads 127, 128 and 129 to the leads 32, 33 and 34, respectively, of the receptacle 24. The lamps 133, 134, 135, 142, 143 and 144 are referenced by suitable indicia to the conductors 11, 12, 13, 17, 18 and 19 associated with their respective leads 26, 27, 28, 32, 33 and 34.

To ready or prepare the instant apparatus for testing the conductors of the cable 10 or to sequentially test the conductors of the cables 10 and 16 and if the contact arms 60, 68, 74 and 80 are not in engagement with the home contacts 61, 69, 75 and 81, the switch 97 is operated to energize the selector switch 58 so that said contact arms are moved step by step until in association with their respective home contacts. The cycling switch 112 is also operated, if necessary, to actuate the selector switch 38 to advance the contact arms 40 and 44 step by step until in association with the initial contacts 41 and 45 of their respective banks of contacts. The plugs 14 and 15 of the cable 10 are then connected respectively to the receptacles 22 and 23 and, in the event the cable 16 is also to be tested, its plugs 20 and 21 are respectively connected to the receptacles 24 and 25.

To initiate the test, the switch 97 is adjusted to momentarily connect the ground lead 101 with the coil 59 of the selector switch 58 to thereby energize said coil as aforesaid. This moves the contact arms 60, 68, 74 and 80 of switch 58 from their respective home contacts into association with the initial operating contacts 62, 70, 76 and 82 of the corresponding banks of contacts. When this occurs, the switch 97 returns to its normal position thereby de-energizing the coil 59 of the switch 58 and connecting the lead 98 to the lead 96. The various elements of the instant testing apparatus are then positioned as shown in the drawing.

Under these conditions, if the conductor 11 is continuous and isolated, the positive side or terminal of the battery 104 is connected to ground thereby completing a circuit for testing the conductor 11. This test circuit for the conductor 11 includes the positive terminal of the battery 104, and the leads 103, 111 and 110. At the junction of the leads 110, 109 and 130, the test circuit divides into three parallel channels that rejoin at the lead 26. The first of these channels includes the lead 109, the coil 108' of the overcurrent relay 108, the common resistor lead 117, the resistor 118 and its lead 121. The overcurrent relay 108 is responsive or sensitive to the current in this channel to operate the switch 107 to either connect or disconnect the leads 109 and 106. Therefore, for purposes of clairity and identification, this channel (109, 108', 117, 118 and 121) shall be referred to hereinafter as the sensing channel. The second channel includes the lead 130, the variable resistor 131, the common lamp lead 132, the lead 136, the lamp 133, the lead 139 and the resistor lead 121. The variable resistor 131 in this channel is adjusted to provide a desired normal current through the coil 108' of the overcurrent relay 108 that balances the current through the resistor 118 in the sensing channel. However, since the primary function of this second channel (130, 131, 132, 136, 133, 139 and 121) is to illuminate the indicator lamp 133, it shall be hereinafter referred to as the indicating channel. The third channel comprises the lead 109, the switch 107, the lead 106, the coil 39 of the selector switch 38, the lead 86, the contact 63, the lead 66, contact 62 and contact arm 60 of the selector switch 58, the lead 87, the switch 88, the lead 90, the contact arm 80 and contact 82 of the selector switch 58, the lead 99, the contact arm 40 and the contact 41 of the selector switch 38. This channel serves to energize or drive the selector switch 38 to advance its contact arms across their respective banks of contacts and hence will be referred to as the driving channel.

As above described, during the testing of the conductor 11 the sensing, indicating and driving channels of the test circuit are jointed to the lead 26. Therefore, the test circuit is completed through the lead 26, the receptacle 22, the plug 14, the conductor 11, the plug 15, the receptacle 23, the lead 29, and a ground channel comprising the contact 45 and contact arm 44 of the selector switch 38, the lead 91, the contact 70 and contact arm 68 of the selector switch 58 and the lead 93 to ground. The resulting current through the test circuit above set forth and, in particular, through its indicating channel, illuminates the lamp 133. Since the normal current in the sensing channel is that resulting from a single resistor, i.e., resistor 118 connected in series with the coil 108' of the overcurrent relay 108, the switch 107 remains closed to connect the leads 109 and 106 which form a part of the driving channel. It follows that the driving channel is then complete and the current therein actuates the selector switch 38 to move or step the contact arms 40 and 44 from their respective contacts 41 and 45 to the contacts 42 and 46, respectively. As a result, the lamp 133 is extinguished. This momentary illumination or lighting of the lamp 133 indicates that the conductor 11 is continuous and isolated.

The association of the contact arms 40 and 44 of the selector switch 38 with their contacts 42 and 46 serves to complete a circuit for testing the conductor 12 of the cable 10. Assuming the conductor 12 to be continuous and isolated, this test circuit is and operates substantially the same as that for testing the conductor 11 except that in this instance the sensing channel includes the resistor 119 and its lead 122, in lieu of the resistor 118 and its lead 121; the indicating channel includes the lead 137, the lamp 134 and the lead 140 in place of the leads 136, the lamp 133 and the lead 139; and the driving channel includes the contact 42 in lieu of the contact 41. Moreover, these sensing, indicating and driving channels rejoin at the lead 27, instead of at the lead 26. Therefore, the test circuit for the conductor 12 is completed through the lead 27, the receptacle 22 and plug 14, the conductor 12, the plug 15 and receptacle 23, the lead 30, and its ground channel includes the contact 46 of the selector switch 38 in lieu of the contact 45 allocated to the conductor 11.

The normal current through this test circuit for the conductor 12 is effective through the indicating channel to momentarily illuminate the lamp 134. Moreover, since the sensing channel includes only the resistor 119, the switch 107 remains closed and the current is fed to the driving channel to step the contact arms 40 and 44 from their respective contacts 42 and 46 to the next adjacent contacts 43 and 47, respectively, thereby extinguishing the lamp 134 and placing the conductor 13 into the circuit for testing its continuity and isolation. The momentary illumination of the lamp 134 indicates that the conductor 12 is continuous and isolated.

If the conductor 13 is continuous and isolated, the association of the contact arms 40 and 44 with their respective contacts 43 and 47 completes a test circuit that is substantially the same in arrangement and operation as the test circuits for the conductors 11 and 12. In this case, however, the sensing, indicating and driving channels rejoin at the lead 28 and include, respectively, the resistor 120 and its lead 123; the lamp 135 and its leads 138 (to the common lamp lead 132) and 141 (to the lead 123); and the contact 43 of the selector switch 38. Also, this circuit is completed through the lead 28, the receptacle 22 and plug 14, the conductor 13, the plug 15 and the receptacle 23, the lead 31 and its ground channel includes the contact 47 of the selector switch 38. As in the other test circuits, the current flow through this circuit momentarily illuminates the lamp 135 and actuates the selector switch 38 to advance its contact arms 40 and 44 thereby extinguishing the lamp 135 and indicating the continuity and isolation of the conductor 13.

At this point in the operation of the instant testing apparatus, the individual conductors 11, 12 and 13 of the cable 10 have each been tested for electrical continuity and isolation. Hence, it has been determined that the cable 10 is suitable for use and if desired, it may be disconnected from the receptacles 22 and 23 and removed from the apparatus before the testing of the cable 16.

As above set forth, the current through the test circuit for the conductor 13 is effective through the driving channel to operate the selector switch 38 and advance its contact arms 40 and 44. As the first bank of contacts of the selector switch 38 is shown as having only three contacts (though it may have any number of contacts dependent on the number of grouped conductors), the final step in the advancement of the contact arm 40 merely moves it out of association with the contact 43. However, the final step in the advancement of the contact arm 44 moves it out of engagement with the contact 47 of the associated bank and into engagement with the transfer contact 48. As hereinbefore described, the contact arms of the selector switch 38 are so arranged that when the contact arm 44 becomes associated with the transfer contact 48, the contact arms 49 and 53 simultaneously engage the initial contacts 50 and 54 of their respective banks of contacts.

The association or engagement of the contact arm 44 with the transfer contact 48 establishes a circuit that actuates the selector switch 58 to advance its contact arms 60, 68, 74 and 80 from their respective contacts 62, 70, 76 and 82 to the next adjacent contacts, viz., contacts 63, 71, 77 and 83. This circuit comprises the positive terminal of the battery 104, the leads 103 and 102, the coil 59 of the selector switch 58, the lead 98, the switch 97, the lead 96, the contact arm 74 and contact 76 of the selector switch 58, the lead 94, the contact 48 and contact arm 44 of the selector switch 38, the lead 91, the contact 70 and contact arm 68 of the selector switch 58 and the ground lead 93.

Upon the advancement of the contact arms 60, 68, 74 and 80 of the selector switch 58 as aforesaid, the instant apparatus automatically begins to sequentially establish the circuits for testing the conductors 17, 18 and 19 grouped in the cable 16. In the following description of this phase of operation of the present apparatus, it is assumed that the conductors 17, 18 and 19 are each electrically continuous and isolated one from the other.

The circuit for testing or analyzing the conductor 17 is substantially the same as that for analyzing the conductor 11, in that it includes the leads 103, 111 and 110, and divides at the junction of the lead 110 with the leads 130 and 109 into three parallel channels, i.e., sensing, indicating and driving channels, that are rejoined at the receptacle lead corresponding to the conductor under test. Thus, the sensing channel comprises the lead 109, the coil 108' of the relay 108, the common resistor lead 117, the resistor 124, and the lead 127 that is connected to the receptacle lead 32. The indicating channel includes the lead 130, the variable resistor 131, the common lamp lead 132, the lead 145, the lamp 142 and the lead 148 that is connected to the resistor lead 127. The driving channel comprises the lead 109, the switch 107, the lead 106, the coil 39 of the selector switch 38, the lead 86, the contact 63 and the contact arm 60 of the selector switch 58, the lead 87, the switch 88, the lead 90, the contact arm 80 and contact 83 of the selector switch 58, the lead 100 and the contact arm 49 and contact 50 of the selector switch 38 to which the receptacle lead 32 is connected.

The test circuit for the conductor 17 is completed through the lead 32, the receptacle 24, the plug 20, the conductor 17, the plug 21, the receptacle 25 and its lead 35 and a ground channel comprising the contact 54 and contact arm 53 of the selector switch 38, the lead 92, the contact 71 and contact arm 68 of the selector switch 58, and the lead 93 to ground.

As in the other test circuits, the current flow through the indicating and driving channels of this circuit momentarily illuminates the lamp 142 to indicate the continuity and isolation of the conductor 17 and advances the contact arms 49 and 53 to the contacts 51 and 55, respectively, thereby establishing the test circuit for the conductor 18.

The test circuit for the conductor 18 differs from the test circuit of the conductor 17 only in that its sensing channel includes the resistor 125 and its lead 128 is connected to the lead 33; its indicating channel includes the lead 146, the lamp 143, and its lead 149 connected to the lead 33; and its driving channel includes the contact 51 of the selector switch 38. Moreover, this test circuit is completed through the lead 33, the receptacle 24 and plug 20, the conductor 18, the plug 21 and receptacle 25, the lead 36 and its ground channel that includes the contact 55 of the selector switch 38.

The current through the above-described test circuit for the conductor 18 momentarily illuminates the lamp 143 to indicate that the conductor 18 is fault-free and actuates the selector switch 38 to advance its contact arms 49 and 53 into association with the contacts 52 and 56, respectively, whereby the test circuit for the conductor 19 is established.

The test circuit for the conductor 19 is substantially the same in both arrangement and operation as the test circuits for the conductors 17 and 18. However, in this case, the sensing, indicating and driving channels meet and are connected to the lead 34 and include, respectively, the resistor 126 and its lead 129, the lamp 144 and its leads 147 and 150, and the contact 52 of the selector switch 38. Further, this test circuit is completed through the lead 34, the receptacle 24 and plug 20, the conductor 19, the plug 21 and receptacle 25, the lead 37 and the ground channel includes the contact 56 of the selector switch 38.

The current through this test circuit momentarily illuminates the lamp 144 thereby indicating the conductor 19 to be fault-free and actuates the selector switch 38 to advance its contact arms 49 and 53.

At this time, the conductors 17, 18 and 19 of the cable 16 have each been tested and proven to be continuous and isolated, and the cable 16 may be removed from the receptacles 24 and 25 and placed in service.

Upon the completion of the testing of the conductor 19, the contact arms of the selector switch 38 are advanced. Thus, the contact arm 53 is stepped into association with the transfer contact 57 of the selector switch 38. This movement of the contact arm 53 completes a circuit for actuating the selector switch 58 to advance its contact arms 60, 68, 74 and 80 to the next adjacent contact in their respective banks of contacts. This actuating circuit for the selector switch 58 comprises the positive terminal of the battery 104, the leads 103 and 102, the coil 59 of the selector switch 58, the lead 98, the switch 97, the lead 96, the contact arm 74 and contact 77 of the selector switch 58, the lead 95, the contact 57 and the contact arm 53 of the selector switch 38, the lead 92, the contact 71 and contact arm 68 of the selector switch 58 and the lead 93 to ground. The energization of the coil 59 of the selector switch 58 by this circuit advances the contact arms 60, 68, 74 and 80 into association with contacts 64, 72, 78 and 84, respectively. As a result, the selector switch 38 and the elements associated therewith, e.g., the receptacles 22, 23, 24 and 25, and the resistors and lamps associated therewith is disconnected from the power source or battery 104.

The contacts 64, 72, 78 and 84 of the selector switch 58 as well as their next adjacent contacts, viz., contacts 65, 73, 79 and 85 are provided to accommodate the connection of the selector switch 58 to a selector switch similar in construction and operation to the selector switch 38 and the receptacles and circuits associated therewith to the end that the capacity of the apparatus may be extended for the testing of at least two additional multi-conductor cables. In this extended form of the invention, the interconnected contacts 64 and 65 and a lead 151 associated therewith serve in the same capacity in the operation of the added switch like switch 38 as the interconnected contacts 62 and 63 and their lead 86 serve in the operation of the switch 38. Similarly, the contacts 72 and 73 and their respective leads 152 and 153 function in the same manner as the contacts 70 and 71 and their leads 91 and 92; the contacts 78 and 79 and their leads 154 and 155 function as do the contacts 76 and 77, and their respective leads 94 and 95; and the contacts 84 and 85 and their respective leads 156 and 157 serve in the same capacity as the contacts 82 and 83 and their leads 99 and 100. In this extended form of the apparatus, the battery 104, over-current relay 108, the common resistor lead 117, the variable resistor 131 and the common lamp lead 132 operate in exactly the same manner as hereinbefore described in conjunction with the first two (illustrated) units, the common lead 117 and 132 being projected for that purpose.

In the operation of the instant cable testing apparatus heretofore described, it was assumed that each of the conductors in the cables 10 and 16 was electrically continuous and isolated. Thus, in the testing of the conductor 11 of the cable 10, the sensing, indicating and driving channels which rejoin at the lead 26, were completed through the conductor 11, the lead 29 and the ground channel comprising the contact 45 and the contact arm 44 of the selector switch 38, the lead 91, the contact 70 and contact arm 68 of the selector switch 58 and the ground lead 93.

It is apparent, therefore, that in the event the conductor 11 is broken at some point between the plugs 14 and 15, the sensing, indicating and driving channels will not be connected to ground through the grounding channel as aforesaid. As a result, the lamp 133 associated with the conductor 11 can not be illuminated nor can the selector switch 38 be actuated to advance its contact arms. Under these conditions, the switch 88 is manually moved to connect the lead 90 to the ground 89. This connects the sensing and indicating channels to ground through the contact 41 and contact arm 40 of the selector switch 38, the lead 99, the contact 82 and contact arm 80 of the selector switch 58, the lead 90, the switch 88 and the lead 89 to ground. When the sensing and indicating channels are thus connected to ground, the lamp 133 associated with and denoting the conductor 11 is and remains illuminated thereby indicating the fault in the conductor 11.

The conductor 11 also may be discontinuous by having its opposite ends attached to non-corresponding terminals in the plugs 14 and 15. For example, the conductor 11 may be attached to the terminal for the conductor 12 in the plug 15 and the conductor 12, in turn, attached to the terminal for the conductor 11 in this plug. In other words, the ends of conductors 11 and 12 attached to the plug 15 are reversed. Under these conditions, the sensing, indicating and driving channels of the conductor 11 are not completed to ground through the lead 29 and the grounding channel as aforesaid since the conductor is connected through the lead 30 to the contact 46 of the selector switch 38 and the contact arm 44 is not then associated with this contact. Therefore, the selector switch 38 does not advance its contact arms 40 and 44 and they remain in association with their respective contacts 41 and 45. Moreover, the lamp 133 associated with and denoting the conductor 11 does not become illuminated. However, since the conductor 12 is connected to the terminal for the conductor 11 in the plug 15, the resistor and indicating channels of the conductor 12, i.e., the resistor 119 and lamp 134 are connected to ground through the conductor 12, the plug 15 and receptacle 23, the lead 29, the contact 45 and contact arm 44 of the selector switch 38, the lead 91, the contact 70 and contact arm 68 of the selector switch 58 and the ground lead 93. Therefore, the lamp 134 is and remains illuminated to indicate one of the two conductors that is reversed, i.e., the conductor 12.

The switch 88 is then manually operated to connect the lead 90 to the ground lead 89. As a result, the resistor 118 and the lamp 133 are now connected to ground through the lead 121, the contact 41 and contact arm 40, the lead 99, the contact 82 and contact arm 80 of selector switch 58, the lead 90, the switch 88 and the ground lead 89, and hence the lamp 133, i.e., the lamp individual to the conductor 11, is and remains illuminated thereby indicating the other of the reversed conductors. Thus, the apparatus indicates both of the conductors in the cable 10 that are reversed.

When the resistors 118 and 119 are both connected to ground, as aforesaid, they are in effect parallel resistances connected in series with the coil 108' of the overcurrent relay 108. Therefore, the resulting increase in current through the coil 108' of the relay 108 operates it to open the switch 107 to thereby disconnect the lead 109 from the lead 106. However, when the manually operated switch 88 is returned to its original position connecting the lead 87 to the lead 90, the current through the coil 108' returns to normal and hence the switch 107 returns to its position where it connects the lead 109 to the lead 106.

Another fault which may occur in a cable is that one or more of its conductors may be short-circuited. For example, the conductor 11 may be in electrical contact or short-circuited with the conductor 12 at some point between the plugs 14 and 15 or perhaps at their connections to the terminals in either of these plugs.

Under the above conditions, when the contact arms 40 and 44 of the selector switch 38 are associated with the contacts 41 and 45, i.e., the contacts connected to the leads 26 and 29 which form continuations of the conductor 11, the sensing, indicating and driving channels of the conductor 11 as well as those of the conductor or conductors short-circuited therewith, i.e., the conductor 12, are connected to ground through the lead 29, and the ground channel comprising the contact 45 and arm 44 of the selector switch 38, the lead 91, the contact 70 and contact arm 68 of the selector switch 58 and the lead 93 to ground. As a result, the lamps 133 and 134 are both illuminated thereby indicating that the conductors 11 and 12 are short-circuited one with the other. In addition, the current through the resistors 118 and 119 results in increasing the current through the relay coil 108', thereby opening the switch 107 and disconnecting the battery 104 from the selector switch 38. This arrests the movement of the switch 38 whereby its contact arms 40 and 44 remain in association with their respective contacts 41 and 45 so that the lamps 133 and 134 remain illuminated. Thus, under short-circuit conditions in the cable 10, the apparatus automatically indicates each conductor involved in the short-circuit.

As above described, any fault in the cable under test results in arresting the operation of the selector switch 38. To continue the testing of the cable, after the fault has been noted and recorded, the cycling switch 112 is closed to move its blades 112' and 112'' into contact with the leads 144 and 116, respectively. This connects the selector switch 38 directly to the battery 104, the circuit comprising the leads 103, 111, 114, the blade 112' of the switch 112, the lead 113, the coil 39 of the selector switch 38, the lead 115, the blade 112'' of the switch 112 and the lead 116 to ground. This circuit energizes the coil 39 so that the contact arms of the selector switch 38 are advanced to the next adjacent contacts at which time the switch 112 is returned to its normal open position, thereby placing the apparatus in condition to continue the testing of the cable.

The present testing apparatus has been illustrated and described in conjunction with two cables 10 and 16 each having but three conductors. Manifestly, with appropriate additions as noted, the capacity of the apparatus may be extended. Also, the number of conductors in each cable may be increased ad infinitum by increasing the number of terminals in the plugs and receptacles, and correspondingly increasing the number of leads from the receptacles, and the contacts in each bank of contacts of the selector switch 38 to which the receptacle leads are connected. Moreover, the number of contacts in each bank of contacts of the selector switch 58 may be increased to accommodate the addition of more than one selector switch similar in construction and operation to the selector switch 38.

What is claimed is:

1. An apparatus for testing the electrical continuity and isolation of each wire of a group of wires comprising a current source connected on one side to ground, a sensing channel connected with one end of each wire of the group through a resistor, an indicating channel including a lamp in parallel with each resistor connected to the same end of each wire of the group, a selector switch to connect the opposite ends of the wires of the group successively to ground, a driving channel for the operation of the selector switch, and a lead from the opposite side of the current source connecting said source to the sensing, indicating and driving channels, whereby the wires of the group are successively incorporated in a complete circuit to thereby indicate the electrical continuity and isolation thereof.

2. An apparatus for testing the electrical continuity and isolation of each wire of a group of wires comprising a current source connected on one side to ground, a sensing channel connected through a resistor to one end of each wire of the group, an indicating channel connected through an indicator individual to and in parallel with each resistor to the same end of each wire, a selector switch to successively connect the opposite ends of the wires of the group to ground, a driving channel for the operation of said selector switch, and means for delivering current from the opposite side of the source constantly to the sensing and indicating channel and normally to the driving channel, including an overcurrent relay adapted to disconnect the current source from the driving channel if the wire under test is shorted.

3. An apparatus for testing the electrical continuity and isolation of each wire of a group of wires comprising a current source connected on one side to ground, a sensing channel connected through an independent resistor to one end of each wire of the group, an indicating channel connected through an indicator individual to and in parallel with each resistor to the same end of each wire, a selector switch to successively connect the opposite ends of the wires of the group to ground, a driving channel for the operation of said selector switch, means for delivering current from the opposite side of the current source constantly to the sensing and indicating channels and normally to the driving channel including a relay adapted to disconnect the current source from the driving channel upon more than one resistor being included in the sensing and indicating channels by a short in the wire under test, and a switch adapted to connect the sensing and indicating channels to ground after the operation of the relay aforesaid.

4. An apparatus for testing the electrical continuity and isolation of each wire of a group of wires comprising a current source connected on one side to ground, a sensing channel connected through a resistor individual to one end of each wire of the group, an indicating channel connected through an indicator individual to and in parallel with each resistor to the same end of each wire, a selector switch to successively connect the opposite ends of the wires of the group to ground, a driving channel for the operation of said selector switch, means for delivering current from the opposite side of the current source constantly to the sensing and indicating channels and normally to the driving channel including a relay adapted to disconnect the current source from the driving channel if the wire under test is shorted, a switch adapted to connect the sensing and indicating channels to ground after the operation of the relay aforesaid for the operation of the indicators that denote the shorted wire or wires, and a second switch in the driving channel to reestablish the operation of the selector switch for the continued testing of subsequent wires in the group.

5. An apparatus for testing the electrical continuity and isolation of each wire of a group of wires, comprising a current source having one side grounded, first circuit means including parallel sensing and indicating channels individually connected to one end of each of said wires and connecting said end of each of said wires in series with the opposite side of the current source, and second circuit means for sequentially connecting the opposite end of each wire to ground.

6. An apparatus for testing the electrical continuity and isolation of each wire of a group of wires, comprising a current source having one side grounded, a circuit including parallel sensing and indicating channels individually connected to one end of each of said wires and connecting the opposite side of the current source in series to said end of each of said wires, means for sequentially connecting the opposite end of each of said wires in series to ground, and means for connecting said sensing and indicating channels to ground independently of said means for sequentially connecting the wires to ground.

7. An apparatus for testing the electrical continuity and isolation of each wire of a group of wires, comprising a source of electricity having one side grounded, a circuit including parallel sensing and indicating channels serially connecting the opposite side of the source of electricity to one end of each of said wires and a channel connected to ground, electrically driven selector means, a driving channel for energizing said electrically driven selector means connected in parallel with the sensing and indicating channels, said electrically driven selector means when energized sequentially connecting the opposite end of each of said wires in series with said ground channel.

8. An apparatus for testing and indicating the electrical continuity and isolation of each wire of a group of wires, comprising a current source having one side grounded, a circuit including parallel sensing and indicating channels connecting the opposite side of the current source in series with one end of each of said wires and a channel connected to ground, electrically actuated means in said circuit to sequentially connect the opposite end of each of said wires in series with said ground channel to complete said circuit, current responsive means in said sensing channel responsive to current flow therethrough to arrest the operation of said electrically actuated means, and means for grounding said sensing and indicating channels independently of said ground channel after arresting the operation of said electrically actuated means as aforesaid.

9. An apparatus for successively testing the electrical continuity and isolation of each wire of a group of wires and sequentially testing the electrical continuity and isolation of the wires of several groups of wires comprising a current source connected on one side to ground, a sensing channel common to all groups of wires and connected with one end of each wire of each group through a resistor, an indicating channel common to all groups of wires including an indicator in parallel with each resistor connected to the same end of the wires of each group, a selector switch for each group of wires to connect the opposite ends of the wires of its associated group successively to ground, a driving channel for the operation of said selector switches in sequence one to the other, means for delivering current from the opposite side of the current source constantly to the sensing and indicating channels and normally to the driving channel including an overcurrent relay adapted to disconnect the current source from the driving channel when the wire under test is shorted, a manual switch for connecting the sensing and indicating channels to ground if and when the driving channel is broken by said relay, a second switch adapted to reestablish the driving channel after being broken by said relay, and means for sequentially transferring the testing operations from one group of wires to another group of wires after the completion of the testing cycle on the first group of wires.

10. An apparatus for testing the electrical continuity and isolation of each wire of a group of wires comprising a current source connected on one side to ground, a sensing channel connected individually through a resistor to one end of each wire of the group, an indicating channel connected through an indicator individual to and in parallel with each resistor to the same end of each wire, a driving channel, a pair of selector switches one to successively connect the opposite ends of the wires of the group to ground and the other adapted to connect the driving channel to the sensing and indicating channels and to the ends of the wires connected to the indicating and sensing channels, means for delivering current from the opposite side of the current source constantly to the sensing and indicating channels and normally to the driving channel including an overcurrent relay adapted to disconnect the current source from the driving channel when the wire under test is shorted, and a switch for connecting the sensing and indicating channels to ground through the second aforesaid selector switch after the operation of the overcurrent relay.

11. In an apparatus for testing the electrical continuity and isolation of each wire in a multi-wire cable, the combination comprising first and second receptacles having corresponding terminals, each pair of corresponding terminals being adapted for series connection with a wire of the cable to be tested, a source of direct current having its negative pole connected to ground, a current-responsive switch including a coil connected in series with the positive pole of said current source, a resistor individual to each terminal of said first receptacle and connected in series to said coil, a variable resistor connected in series to the positive pole of said current source, a lamp individual to each of said resistors connected in parallel therewith and in series with said variable resistor, a selector switch having first and second banks of corresponding contacts, each pair of said corresponding contacts being connected in series with a pair of corresponding terminals of said first and second receptacles with the contacts of the first bank connected to the terminals of the first receptacle and the contacts of the second bank connected to the terminals of the second receptacle, a first contact arm cooperating with said first bank of contacts, a second contact arm cooperating with said second bank of contacts, said first and second contact arms being arranged to contact concurrently a pair of corresponding contacts, electrical means for moving simultaneously said first and second contact arms over their respective banks of contacts, a manual switch connected in series with said current-responsive switch, said electrical moving means of said selector switch and said first contact arm, said manual switch being adapted to connect said first contact arm to the positive pole of said current source or to ground, and said second contact arm being always connected to ground.

12. In an apparatus for testing the electrical continuity and isolation of each wire in a multi-wire cable, the combination comprising first and second receptacles having corresponding terminals at least equal in number to the number of wires in the cable to be tested, each pair of corresponding terminals being connected in series with a wire of the cable to be tested, a source of direct current having its negative pole connected to ground, a current-responsive switch including a coil connected in series with the positive pole of said current source, a resistor individual to each terminal of said receptacle and connected in series with said coil, a variable resistor connected to the positive pole of said current source, a lamp individual to each terminal in said first receptacle and connected in series with said variable resistor, first and second banks of corresponding contacts, each pair of corresponding contacts being connected to a pair of corresponding terminals of said first and second receptacles with the contacts of the first bank connected to the terminals of the first receptacle and the contacts of the second bank connected to the terminals of the second receptacle, first and second contact arms cooperating with said first and second banks of contacts and arranged to contact concurrently a pair of corresponding contacts in their respective banks, electrical means for moving simultaneously said first and second contact arms over their respective banks of contacts, said first contact arm being connected through said electrical moving means to the positive pole of said current source and said second contact arm being connected to ground.

13. In an apparatus for testing the electrical continuity and isolation of each wire in a multi-wire cable, the combination comprising first and second receptacles having corresponding terminals, each pair of corresponding terminals being adapted for series connection with a wire of the cable to be tested, a source of direct current having its negative pole connected to ground, a current-responsive switch including a coil connected in series with the positive pole of said current source, a common resistor lead connected in series with the coil of said current-responsive switch, a resistor individual to each terminal of said first receptacle and connected between said common resistor lead and its associated terminal, a variable resistor connected in series to the positive pole of said current source, a common lamp lead connected in series with said variable resistor, a lamp individual to each terminal in said first receptacle and connected in parallel with the resistor of said terminal between the common lamp lead and its associated terminal, a selector switch having first and second banks of corresponding contacts, each pair of said corresponding contacts being connected in series with a pair of corresponding terminals of said first and second receptacles with the contacts of the first bank connected to the terminals of the first receptacle and the contacts of the second bank connected to the terminals of the second receptacle, a first contact arm cooperating with said first bank of contacts, a second contact arm cooperating with said second bank of contacts, said first and second contact arms being arranged to contact concurrently a pair of corresponding contacts, electrical means for moving simultaneously said first and second contact arms over their respective banks of contacts, a manual switch series connected with and interposed between said first contact arm and said electrical moving means of said selector switch, said manual switch being adapted to connect said first contact arm to the positive pole of said current source or to ground, and said second contact arm being connected to ground.

14. In an apparatus for testing the electrical continuity and isolation of each wire in a multi-wire cable, the combination comprising first and second receptacles having corresponding terminals at least equal in number to the number of wires in the cable to be tested, each pair of corresponding terminals being connected in series with a wire of the cable to be tested, a source of direct current having its negative pole connected to ground, a current-responsive switch including a coil connected in series with the positive pole of said current source, a common resistor lead connected in series with the coil of said current responsive switch, a resistor individual to each terminal of said first receptacle and connected between said common resistor lead and its associated terminal, a variable resistor connected to the positive pole of said current source, a common lamp lead connected in series with said variable resistor, a lamp individual to each terminal in said first receptacle and connected between the common lamp lead and its associated terminal, a first bank of contacts, a second bank of contacts corresponding to the contacts of said first bank, each pair of corresponding contacts being connected to a pair of corresponding terminals of said first and second receptacles with the contacts of the first bank connected to the terminals of the first receptacle and the contacts of the second bank connected to the terminals of the second receptacle, a first contact arm cooperating with said first bank of contacts, a second contact arm cooperating with said second bank of contacts, said first and second contact arms being arranged to contact concurrently a pair of corresponding contacts, electrical means for moving simultaneously said first and second contact arms over their respective banks of contacts, said first contact arm being connected through said electrical moving means to the positive pole of said current source and said second contact arm being connected to ground.

15. In an apparatus for testing the electrical continuity and isolation of each wire in a multi-wire unit, the combination comprising first and second receptacles having corresponding terminals, each pair of corresponding terminals being connected in series with a wire of the unit to be tested, a source of direct current having its negative pole connected to ground, a current-responsive switch including a coil connected in series with the positive pole of said current source, a common resistor lead connected in series with the coil of said current-responsive switch, a resistor individual to each terminal of said first receptacle and connected between said common resistor lead and its associated terminal, a variable resistor connected to the positive pole of the current source, a common lamp lead connected in series with said variable resistor, a lamp individual to each terminal in said first receptacle and connected between the common lamp lead and its associated terminal, a selector switch having first and second banks of corresponding contacts, each pair of said corresponding contacts being connected to a pair of corresponding terminals of said first and second receptacles with the contacts of the first bank connected to the terminals of the first receptacle and the contacts of the second bank connected to the terminals of the second receptacle, a first contact arm cooperating with said first bank of contacts, a second contact arm cooperating with said second bank of contacts, said first and second contact arms being arranged to contact concurrently a pair of corresponding contacts, electrical means for moving simultaneously said first and second contact arms over their respective banks of contacts, a manual switch, said first contact arm being connected in series with said manual switch, said electrical moving means of said selector switch and the coil of said current-responsive switch to the positive pole of said current source, and means connecting said second contact arm to ground.

16. An apparatus for testing the electrical continuity and isolation of each wire of a group of wire, comprising a current source having its negative pole connected to ground, a current-responsive switch connected in series with the positive pole of said current source, a resistor lead connected in series with said current-responsive switch, a resistor individual to each wire of the group and connected between one end of its associated wire and said resistor lead, a lamp connected in parallel with each of said resistors, and a selector switch including electrically driven operating means connected in series with said current-responsive switch, said selector switch being constructed and arranged when operating to connect its electrically driven operating means successively to the ends of the wires associated with the resistors and lamps and to connect concurrently the opposite ends of said wires to ground, said current-responsive switch being responsive to current flow therethrough resulting from current flow through more than one of said resistors and lamps to halt the operation of said selector switch.

17. An apparatus for successively testing the electrical continuity and isolation of individual wires arranged in several groups comprising a sensing channel and an indicating channel common to all such groups, a resistor connecting one end of each wire of the several groups to the sensing channel, an indicator interposed between the indicating channel and the wires in parallel with each resistor, a current source connected on one side to ground and on the other side to the sensing and indicating channels, a multi-bank selector switch two banks whereof being allocated to each group of wires, one bank being arranged to successively connect the ends of the wires of that group connected to the sensing and indicating channels to the current source and the other bank being arranged to successively connect the opposite ends of said wires to ground, a driving channel for the operation of the selector switch, and a second multi-bank selector switch operative upon the completion of the testing of the wires of one group to initiate the testing of the wires of the next group.

18. An apparatus for successively testing the electrical continuity and isolation of individual wires arranged in several groups comprising a sensing channel and an indicating channel common to all such groups, a resistor connecting one end of each wire of the several groups to the sensing channel, an indicator interposed between the indicating channel and the wires in parallel with each resistor, a current source connected on one side to ground and on the other side to the sensing and indicating channels, a multi-bank selector switch two banks whereof being allocated to each group of wires, one bank being arranged to successively connect the ends of the wires of that group connected to the sensing and indicating channels to the current source and the other bank being arranged to successively connect the opposite ends of said wires to ground, and the bank of the selector switch connecting the wires to ground being provided with an extra contact, a driving channel for the operation of the aforesaid selector switch, a second multi-bank selector switch operative on the completion of the testing of the wires of one group to initiate the testing of the wires of the next group, and a lead between the aforesaid extra contact and the second selector switch to connect it to the current source and to ground.

19. An apparatus for successively testing the electrical continuity and isolation of individual wires arranged in several groups comprising a sensing channel and an indicating channel common to all such groups, a resistor connecting one end of each wire of the several groups to the sensing channel, an indicator interposed between the indicating channel and the wires in parallel with each resistor, a current source connected on one side to ground and on the other side to the sensing and indicating channels, a multi-bank selector switch having corresponding pairs of banks, one corresponding pair of banks being allocated to each group of wires with one of its banks arranged to successively connect the ends of the wires of that group connected to the sensing and indicating channels to the current source and the other of its banks arranged to successively connect the opposite ends of said wires to ground, a driving channel for the operation of the selector switch, and means for successively placing into operation each corresponding pair of banks of said selector switch.

References Cited in the file of this patent

UNITED STATES PATENTS

| 2,478,414 | Michal | Aug. 9, 1949 |
| 2,488,556 | Parmenter | Nov. 22, 1949 |
| 2,762,014 | Anderson | Sept. 4, 1956 |
| 2,805,391 | Meadows | Sept. 3, 1957 |
| 2,849,677 | Hannon | Aug. 26, 1958 |

FOREIGN PATENTS

| 749,669 | Great Britain | May 30, 1956 |